US005241667A

United States Patent [19]

Matsumoto

[11] Patent Number: 5,241,667

[45] Date of Patent: Aug. 31, 1993

[54] ELECTRONIC EQUIPMENT CONTROLLING APPARATUS UTILIZING REFERENCE CLOCK GENERATOR MEANS

[75] Inventor: Katsumi Matsumoto, Saitama, Japan

[73] Assignee: Kabushiki Kaisha Toshiba, Kawasaki, Japan

[21] Appl. No.: 781,176

[22] PCT Filed: Apr. 11, 1991

[86] PCT No.: PCT/JP91/00476

§ 371 Date: Oct. 31, 1991

§ 102(e) Date: Oct. 31, 1991

[87] PCT Pub. No.: WO91/16671

PCT Pub. Date: Oct. 31, 1991

[30] Foreign Application Priority Data

Apr. 13, 1990 [JP] Japan .................................... 2-98525

[51] Int. Cl.[5] .......................... G06F 1/04; G06F 13/00

[52] U.S. Cl. .................................... 395/550; 395/275; 364/DIG. 1; 364/271.1; 364/238.3

[58] Field of Search ................ 395/550, 275; 364/200, 364/900, 271.1, 238.3

[56] References Cited

U.S. PATENT DOCUMENTS 4,821,032 4/1989 Shimada et al. .................... 358/185
4,847,756 7/1989 Ito et al. ............................ 395/550
4,905,212 2/1990 Wakahara ........................... 368/10

*Primary Examiner*—Dale M. Shaw
*Assistant Examiner*—Diane E. Smith
*Attorney, Agent, or Firm*—Cushman, Darby & Cushman

[57] ABSTRACT

An apparatus connecting a main controller for controlling an operation of an electric equipment and a sub controller for conducting a clock operation through a communication device is characterized in that the main controller generates a data having a predetermined period based on a reference clock and sends out the data through the communication device, and in that the sub controller receives the data sent from the main controller through the communication device and conducts a clock operation based on the period of the data. Because clock information is produced based on a communication period of the data from the main controller, the sub controller does not need a highly precise reference oscillator.

5 Claims, 3 Drawing Sheets

ELECTRONIC EQUIPMENT CONTROLLING APPARATUS UTILIZING REFERENCE CLOCK GENERATOR MEANS

TECHNICAL FIELD

This invention relates to a clock apparatus of an electric equipment such as a video tape recorder which time-controls timer picture recording or the like, and more particularly to a clock apparatus which controls clock information prepared by a sub controller on the basis of the output of a reference oscillator contained in the main controller with high precision in a system in which a main controller and the sub controller are connected through a communication device.

BACKGROUND TECHNOLOGY

Generally, an electric equipment such as a video tape recorder having a timer function includes a micro computer for system controlling (micro computer is written as CPU, hereinafter) which controls the equipment over all and a CPU for a timer, which generates clock information and a timer controlling signal based on the clock information. These CPUs are connected each other through a communication device so as to timer-control the equipment.

FIG. 3 shows an example of the above mentioned system. Reference numeral 1 represents a CPU for system controlling and 2 represents a CPU for a timer. The CPU 1 for system controlling and the CPU 2 for a timer have communication interface circuits 14 and 21, respectively, which transfer a baseband data. These communication interface circuits 14 and 21 are connected through a line 4 so that one-to-one data transfer is available.

The CPU 1 for system controlling controls the operation of the equipment by a data generating circuit 13 connected to the communication interface circuit 14. In other words, the data generating circuit 13 generates a servo data based on a feedback signal supplied from a controlled part 3 containing a channel selecting circuit, a servo circuit or the like. Also, the data generating circuit 13 detects the condition of the controlled part 3, such as the amount of remaining tape and whether a cassette is fitted or not and generates a displaying data for displaying the condition. The above mentioned displaying data is transferred to the line 4 through the communication interface circuit 14 and received by a communication interface circuit 21 of the CPU 2 for a timer. The CPU 1 for system controlling contains a reference oscillator 12 connected with a crystal vibrator 11x and capacitance 11c, 11c' on its outside and the reference oscillator 12 generates a high frequency clock such as 10 MHz. The clock is divided into several lower frequencies by a frequency divider 15 and used as an operation clock (A) of the CPU 1. On the other hand, the clock is divided into about one hundredth by a frequency divider 16 and used as a communication clock (B). Further, the communication clock (B) is divided by a frequency divider 17 and used as a clock (C) which determines the transferring period of the above mentioned data. From the data generating circuit 13, the data is synchronized with the communication clock (B) and read out as a bit unit and transferred from the communication interface circuit 14 to the same circuit 21 as an unified data by a period T of the clock (C).

The CPU 2 for a timer is connected to a displaying circuit 5 for displaying an operating condition of the controlled part 3 and time, and an outer input circuit 6 composed of a remote control transmitter, a keyboard or the like. The CPU 2 processes an input data supplied from an outer input circuit 6 and at the same time processes a displaying data supplied from the CPU 1 for system controlling through the communication interface circuit 21 by using the data generating circuit 22. A data generating circuit 22 generates a data which sets up an operating condition of the equipment, such as a data for recording and stopping, based on the input data from the outer input circuit 6, and generates a program data which carries out a timer operation. The data for setting up an operation is transferred to the communication interface circuit 21 and sent to the CPU 1 for system controlling, and the program data is temporally stored in a memory of a timer controlling circuit 26. The program data consists of a reserved time data and an operation setting data, such as a channel data instructing selected channel. The CPU 2 for a timer contains a reference oscillator 23 which connects with a crystal vibrator 24x and capacitance 24c, 24c' on its outside and the reference oscillator 23 generates a high frequency clock in the same way as the above mentioned reference oscillator 12. The clock is divided into several lower frequencies by a frequency divider 27 and used as an operation clock (F) of the CPU 2. On the other hand, the clock is divided into about one hundredth by a frequency divider 30 and used as a time clock (G).

Also, the CPU 2 for a timer includes a clock information generating circuit 25 which counts the clock (G) obtained by dividing the output of the reference oscillator 23 contained in the CPU 2 and generates clock information. The clock information generating circuit 25 supplies generated clock information to the timer controlling circuit 26 and transfers it to the data generating circuit 22 through the timer controlling circuit 26. The timer controlling circuit 26 compares the above mentioned clock information and a reserved time data in the memory and transfers an operation setting data, such as a selecting channel data to the data generating circuit 22 when both time information coincides. The data generating circuit 22 transfers the operation setting data of the timer program to the CPU 1 for system controlling through the communication interface circuit 21. Also, the clock information transferred to the data generating circuit 22 is processed in the data generating circuit 22 and displayed on the displaying circuit 5 as a time data.

The above mentioned system controls the controlled part 3 by the CPU 1 for system controlling and regularly transfers the displaying data which shows the operating condition of the controlled part 3 to the CPU 2 for a timer so that the data can be displayed on the displaying circuit 5. Also, when the controlled part 3 is timer-controlled, an input data from the outer input circuit 6 is processed by the CPU 2 for a timer and a timer program is set in the memory of the timer controlling circuit 26. When the clock information coincides with the reserved time data in the memory, a timer operation setting data, such as a selecting channel data is transferred to the communication interface circuit 14 of the CPU 1 for system controlling through the communication interface circuit 21 and the line 4. Therefore, the data generating circuit 13 timer-controls the controlled part 3 by the data from the communication interface circuit 14.

Since the above mentioned system is composed of a digital circuit in which, for example, a servo circuit and a channel selecting circuit in the controlled part 3 process a digital signal, a highly precise clock is needed to generate a data supplied to these circuits. Thus, the CPU 1 for system controlling drives the data generating circuit 13 by the highly precise clock caused by the reference oscillator 12 fitted to the crystal vibrator 11x on its outside, and forms and processes the data corresponding to the controlled part 3 of the digital circuit structure. Also, the CPU 2 for a timer contains a highly precise reference oscillator 23 using the crystal vibrator 24x to count the clock information and carries out an accurate timer operation.

However, according to the above mentioned structure, both the CPU 1 for system controlling and the CPU 2 for a timer use crystal vibrators having a highly precise oscillating function so that the system becomes expensive.

Thus, the object of this invention is to provide a clock apparatus in which precise clock information can be generated by using only one highly precise reference oscillator.

DISCLOSURE OF THE INVENTION

This invention is composed of a main controller controlling the operation of an equipment, and the main controller generates a data having a predetermined period based on a reference clock and transfers the data through communication means, and a sub controller which receives the data transferred from the main controller through the communication means and carries out a clock operation based on the period of the data.

Further, in an equipment such as a VTR, this invention is formed by comprising a micro computer for system controlling including a reference oscillator, data generating means for generating data having a predetermined period based on a reference clock output from the reference oscillator and first communication interface means for transferring a data generated by the data generating means, and a micro computer for a timer including second communication interface means receiving the data output from the first communication interface means through a line and clock information generating means generating clock information based on the period of the above mentioned data received by the second communication interface means.

Since the sub controller counts and outputs the clock information by using a transferring period of the data from the main controller according to such structure, highly precise clock information based on the reference clock generated by the main controller can be generated in the sub controller even if the sub controller is not equipped with a highly precise reference oscillator. Accordingly, a highly precise timer operation becomes available in an equipment, such as a VTR.

BEST MODES OF CARRYING OUT THE INVENTION

Figure 1:
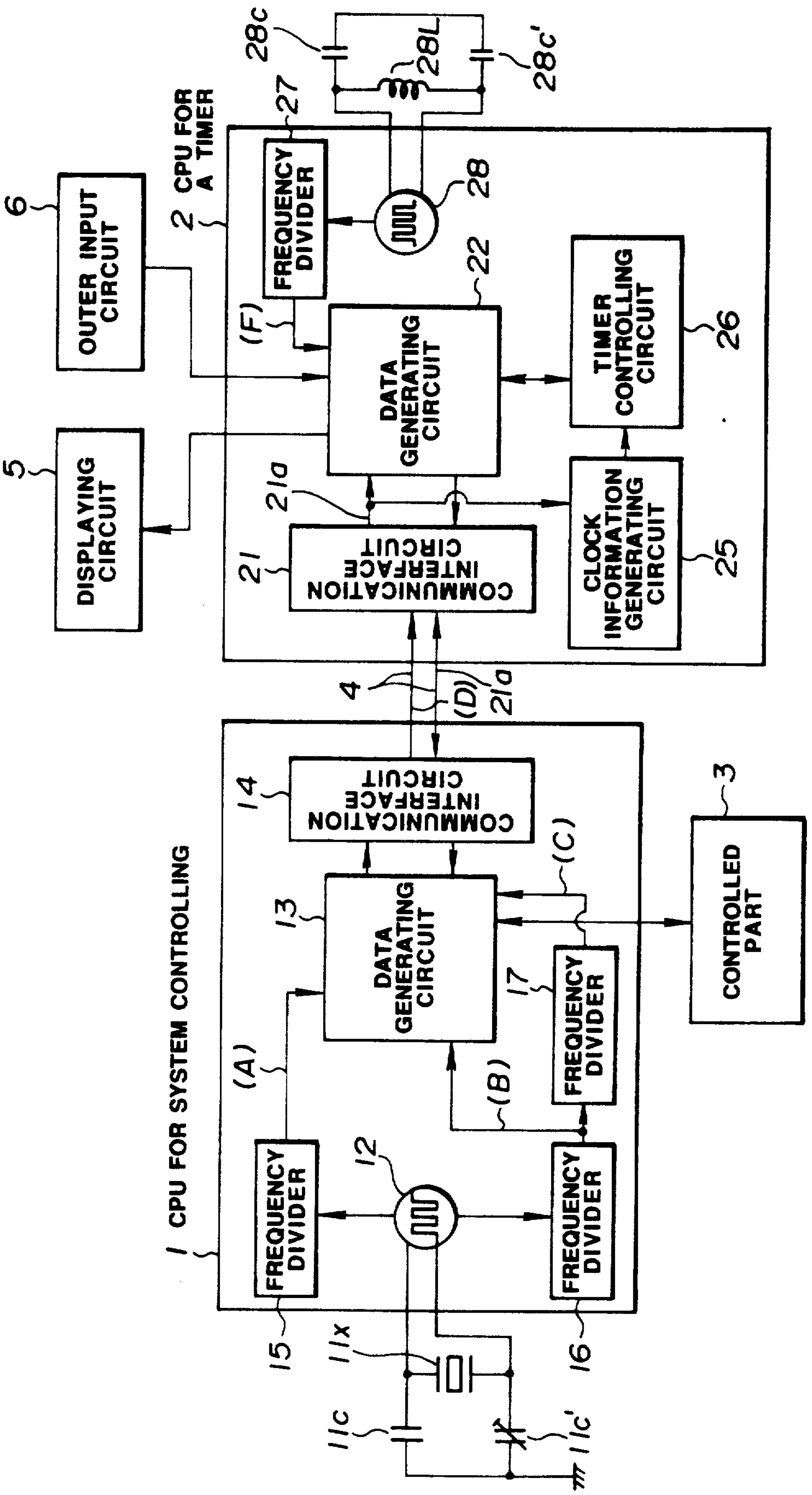
FIG. 1 is a block diagram showing an embodiment of a clock apparatus relating to this invention.

This invention will be explained in detail by using embodiments shown in the drawings.

FIG. 1 is a block diagram showing an embodiment of a clock apparatus relating to this invention.

Figure 3:
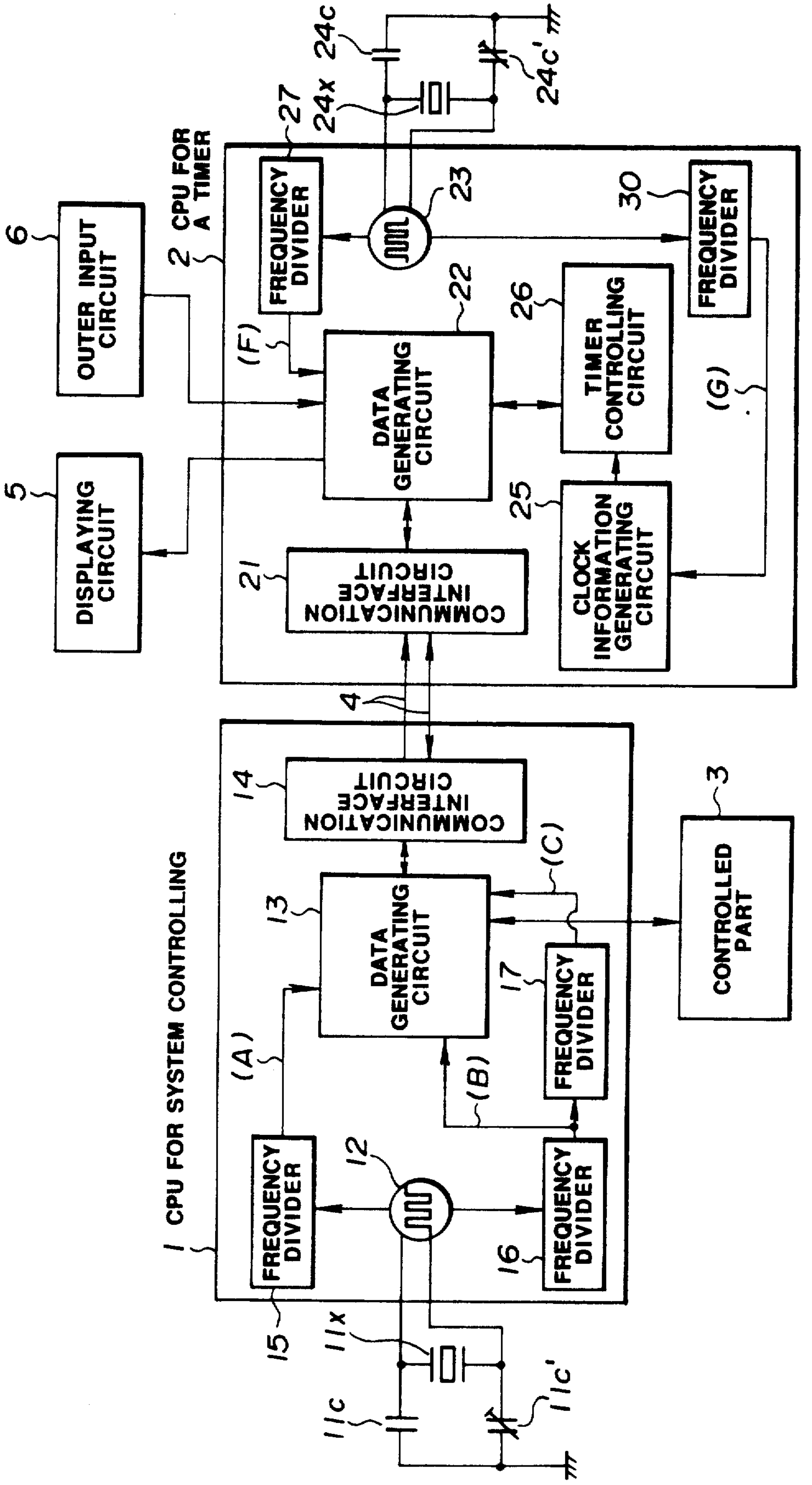
FIG. 3 (RELATED ART)
FIG. 3 is a block diagram showing a former clock apparatus.

In FIG. 1, the same reference numerals are used for common elements of the structure as shown in FIG. 3. A CPU 1 for system controlling and a CPU 2 for a timer have communication interface circuits 14 and 21, respectively, so that each other's communication is available. The CPU 1 for system controlling is fitted with a crystal vibrator 11x and capacitance 11C, 11C' on its outside as an oscillating controlling device of a reference oscillator 12. Thus, the CPU 1 drives a data generating circuit 13 by using a reference clock (A) obtained by dividing the clock from the reference oscillator 12 by a frequency divider 15. The data generating circuit 13 connects to the communication interface circuit 14 and controls a controlled part 3. Also, the data generating circuit 13 transfers a displaying data showing the operating condition of the controlled part 3 to a line 4 through the communication interface circuit 14. At the same time, the data generating circuit 13 obtains a communication clock (B) by dividing the clock from the reference oscillator 12 by the frequency divider 16 and is synchronized with the communication clock (B) so as to read out the data in the circuit 13 as a bit unit, and also, the data is synchronized with a clock(C) of a communication period T obtained by dividing the clock(B) by a frequency divider 17 so that the data is transferred to the line 4 through the communication interface circuit 14 as a unified displaying data 21a (E). Further, the displaying data 21a is transferred to the line 4 with a data clock (D) corresponding to the number of bit of a unified data. Also, the CPU 1 for system controlling is fed with the data for setting up the operation or a timer program data transferred from the CPU 2 for a timer, processes these data in the data generating circuit 13 and controls the controlled part 3. The frequency dividers 16 and 17 from among the frequency dividers 15, 16 and 17 can be materialized in the software in the data generating circuit 13.

A communication interface circuit 21 of the CPU 2 for a timer receives the displaying data 21a (E) and the data clock (D) from the CPU 1 for system controlling. Also, the circuit 21 is fed with a data for setting up the operation based on the input data from an outer input circuit 6 or a timer program data from a timer controlling circuit 26 through a data generating circuit 22 and transfers the data to the CPU 1 for system controlling. The displaying data 21a (E) received by the circuit 21 is processed in the data generating circuit 22 and supplied to the displaying circuit 5.

In this embodiment, the communication interface circuit 21 transfers the above mentioned displaying data 21a(E) to the clock information generating circuit 25, as well. Therefore, the clock information generating circuit 25 detects the transferring period T of the displaying data 21a and generates clock information based on the period T. The clock information generated in the clock information generating circuit 25 is supplied to the timer controlling circuit 26, as before. Also, the clock information controls a memory in the timer controlling circuit 26 and is supplied to the displaying circuit 5 through the data generating circuit 22. Also, in a reference oscillator 28 contained in the CPU 2 for a timer, oscillated frequency is controlled by an LC outside fitted circuit composed of an inductance 28L and capacitance 28c, 28c', so that the oscillator 28 can generate the same high frequency clock as the reference oscillator 12 of the predetermined frequency. The clock is divided into several lower frequencies by a frequency divider 27 and used as an operating clock (F) of the CPU 2. A pulse for driving the displaying circuit 5 is made of the clock of the oscillator 28.

In the clock apparatus having such structure, the displaying data 21a which is transferred by the communication interface circuit 14 is a data showing the operation of the controlled part 3 and transferred to the CPU 2 for a timer with a regular transferring period T.

Figure 2:
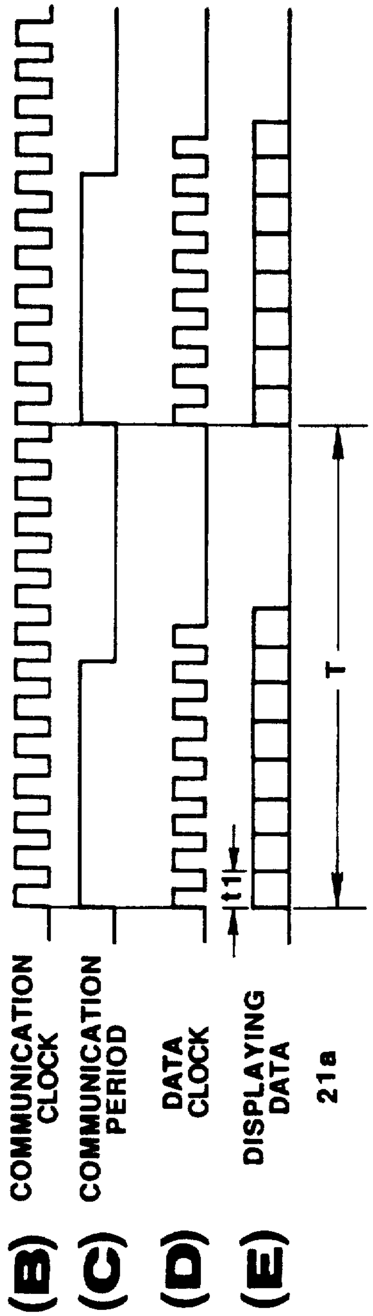
FIG. 2 is a timing chart explaining the operation of the embodiment of FIG. 1.

FIG. 2 shows the communication clock (B), the communication period (C), and the data clock (D) in the CPU 1 for system controlling and the displaying data 21a (E) which are produced by using the communication clock (B), the communication period (C). (B) represents a communication clock from the frequency divider 16, (C) represents the communication period obtained from the frequency divider 17, (D) represents the data clock for reading out data in the data generating circuit 13 and (E) represents the displaying data 21a read out from the data generating circuit 13. By counting a predetermined number of the communication clock (B) from the building-up of the clock (C) of the communication period, the predetermined number of the data clock (D) corresponding to one data is obtained and the displaying data 21a, which is synchronized with the clock (D) and read out, is also obtained. Also, the data generating circuit 22 processes the displaying data 21a by a clock (F) obtained by dividing the clock from the reference oscillator 28; however, even if the precision of the period of the clock (F) is low by using an LC circuit, the level of the displaying data 21a is determined without any trouble.

In the meantime, a transferring period T of the displaying data 21a is very precise because it is determined by the highly precise clock from the reference oscillator 12. Accordingly, the clock information generating circuit 25 performs counting operation by the communication period T of the displaying data 21a so that highly precise clock information, which is not inferior to the precision as before, can be secured.

According to this embodiment, it is not necessary to make a clock generated by the reference oscillator 28 highly precise because the clock generated in the CPU 2 for a timer is not counted as the count clock of the clock information generating circuit 25. Also, since the reference clock is not directly received from the CPU 1 for system controlling, no special wiring is required.

Even if the transferring period T is unstable due to an interrupting process or the like in the CPU 1 for system controlling or the CPU 2 for a timer, the timer operation becomes correct provided that the period T is constant in the long run. In other words, even if there is some fluctuation in each period t1 of the data clock (D) (see FIG. 2) which is produced by dividing, the period of the displaying data can be constant in the long run because the displaying data is generated in accordance with the communication period T based on the clock of the reference oscillator 11.

In the case of the former structure (FIG. 3), the clock information generating circuit 25 requires a frequency divider 30 to count the clock of the reference oscillator 23. However, in this embodiment, for example, the communication period T is fixed as about 20 msec. Thus, if one count operation is carried out at an interval of 20 msec, 50 counts make one second so that the clock information generating circuit 25 has an advantage in which no frequency divider is needed and also no burden is involved in the software. Further, the working for adjusting the reference oscillators highly precisely is satisfied by adjusting only one of the reference oscillators. Thus, adjusting working becomes easy. Also, this invention can be applied to the case of synchronous communication in which a clock is sent with a data, and also can be applied to the case of asynchronous communication in which a clock is not sent.

Further, the embodiment of FIG. 1 is a system in which the CPU 1 for system controlling and the CPU 2 for a timer communicate the data by two-way communication. However, this invention can be also applied to a system of one-way communication only from the side of the CPU for system controlling to the side of the CPU for a timer. In addition to the LC device shown in FIG. 1, a ceramic vibrator can be used as a vibrator of the reference oscillator 28.

AVAILABILITY IN INDUSTRY

As mentioned above, according to this invention, there is an effect in which the clock information on the side of the sub controller also becomes highly precise without requiring any special modification of the structure provided that only the reference clock on the side of a main controller is made correct. Accordingly, it is effective that this invention is used in an electric equipment such as a VTR having a system controlling means and a timer controlling means. Also, the invention can be applied not only to the case in which clock information is supplied from a main controller to a sub controller but also to the case in which clock information is supplied from a main controller to many sub controllers at the same time.

What is claimed is:

1. An apparatus for controlling electronic equipment comprising:
   - a main controller including:
     - a reference clock generator,
     - a means for receiving operational setting information data,
     - means, responsive to said operational setting information data, for generating control data for controlling said electronic equipment,
     - means, responsive to said operational setting information and control date, for generating operating condition data representing a state of the controlled electronic equipment,
     - means for transmitting said operating condition data from said main controller at a predetermined period synchronized with said reference clock;
   - a sub-controller including:
     - means for receiving electronic equipment setting information indicative of an operating state of said electronic equipment,
     - means, responsive to said electronic equipment setting information, for generating operational setting information data,
     - means for transmitting said operational setting information data from the sub-controller,
     - means for receiving said operating condition data,
     - means for establishing a high-precision reference clock based on a period of transmission of operating condition data;

a communication means including;

means for transmitting said electronic equipment setting information between said electronic equipment and sub-controller, means for transmitting said control data between said main controller and electronic equipment, and means for transmitting said operational setting information data and operating condition data between said main controller and said sub-controller.

2. An apparatus for controlling electronic equipment as found in claim 1, further comprising:

a display means for displaying said operating condition of said electronic equipment; and wherein said sub-controller further includes means, responsive to said operating condition data received from said main controller, for generating an operating condition display signal to control said display means.

3. An apparatus for controlling electronic equipment as found in claim 1, wherein said reference clock generator comprises:

a reference oscillator to establish a high frequency timing signal, a crystal vibrator and capacitance to control oscillation of said reference oscillator in a high precision fashion, and a frequency divider to divide said high frequency timing signal into a lower frequency reference clock signal.

4. An apparatus for controlling electronic equipment as found in claim 1, wherein said sub-controller further includes a low-precision clock generator, comprising:

a reference oscillator to establish a high frequency timing signal, an inductance and capacitance circuit to control oscillation of said reference oscillator in a low precision fashion, and a frequency divider to divide said high frequency timing signal into a lower frequency reference signal.

5. An apparatus for controlling electronic equipment as found in claim 1, wherein said means for establishing a high-precision reference clock within said sub-controller includes a counter for detection of a period of transmission of said operating condition data received from said main controller.

* * * * *